(12) United States Patent
Micusik

(10) Patent No.: US 12,125,150 B2
(45) Date of Patent: Oct. 22, 2024

(54) SCENE CHANGE DETECTION WITH NOVEL VIEW SYNTHESIS

(71) Applicant: Snap Inc., Santa Monica, CA (US)

(72) Inventor: Branislav Micusik, St.Andrae-Woerdern (AT)

(73) Assignee: Snap Inc., Santa Monica, CA (US)

( * ) Notice: Subject to any disclaimer, the term of this patent is extended or adjusted under 35 U.S.C. 154(b) by 76 days.

(21) Appl. No.: 17/677,821

(22) Filed: Feb. 22, 2022

(65) Prior Publication Data

US 2023/0267691 A1    Aug. 24, 2023

(51) Int. Cl.
| | |
|---|---|
| *G06T 19/00* | (2011.01) |
| *G06F 3/01* | (2006.01) |
| *G06F 3/0346* | (2013.01) |
| *G06V 10/75* | (2022.01) |
| *G06V 10/82* | (2022.01) |
| *G06V 20/40* | (2022.01) |

(52) U.S. Cl.
CPC ............ *G06T 19/006* (2013.01); *G06F 3/017* (2013.01); *G06F 3/0346* (2013.01); *G06V 10/76* (2022.01); *G06V 10/82* (2022.01); *G06V 20/46* (2022.01)

(58) Field of Classification Search
None
See application file for complete search history.

(56) References Cited

U.S. PATENT DOCUMENTS

| | | | | |
|---|---|---|---|---|
| 11,684,247 | B2 * | 6/2023 | Hale | A61B 1/0655 348/74 |
| 2007/0061076 | A1 * | 3/2007 | Shulman | G06T 7/97 701/500 |
| 2011/0110605 | A1 * | 5/2011 | Cheong | G06T 3/4038 382/284 |

(Continued)

FOREIGN PATENT DOCUMENTS

| | | |
|---|---|---|
| JP | 2022105442 | 7/2022 |
| WO | 2006074298 | 7/2006 |

OTHER PUBLICATIONS

Elmoogy et al., "Pose-GNN : Camera Pose Estimation System Using Graph Neural Networks", arXiv:2103.09435, URL: https://arxiv.org/abs/2103.09435 (Year: 2021).*

(Continued)

*Primary Examiner* — David H Chu
(74) *Attorney, Agent, or Firm* — Schwegman Lundberg & Woessner, P.A.

(57) ABSTRACT

A method for detecting changes in a scene includes accessing a first set of images and corresponding pose data in a first coordinate system associated with a first user session of an augmented reality (AR) device and accessing a second set of images and corresponding pose data in a second coordinate system associated with a second user session. The method identifies the first set of images corresponding to a second image from the second set of images based on the pose data of the first set of images being determined spatially closest to the pose data of the second image after aligning the first (Continued)

coordinate system and the second coordinate system. A trained neural network generates a synthesized image from the first set of images. Features of the second image are subtracted from features of the synthesized image. Area of changes are identified based on the subtracted features.

19 Claims, 14 Drawing Sheets

(56) References Cited

U.S. PATENT DOCUMENTS

| | | | | |
|---|---|---|---|---|
| 2012/0280988 | A1* | 11/2012 | Lampotang | G09B 23/285 |
| | | | | 434/262 |
| 2018/0188382 | A1* | 7/2018 | Jose | G01S 19/27 |
| 2019/0050625 | A1* | 2/2019 | Reinstein | G06V 10/235 |
| 2019/0279346 | A1* | 9/2019 | Zhang | G06T 5/50 |
| 2020/0249748 | A1* | 8/2020 | Ranganathan | A63F 13/40 |
| 2020/0293270 | A1* | 9/2020 | Boeen | G06F 3/165 |
| 2020/0302584 | A1* | 9/2020 | Zhang | G06F 18/214 |
| 2020/0356812 | A1* | 11/2020 | Oleynik | H04N 13/246 |
| 2020/0393823 | A1* | 12/2020 | Mohr | G05B 19/41875 |
| 2021/0270611 | A1* | 9/2021 | Maehara | G06V 20/13 |

OTHER PUBLICATIONS

"International Application Serial No. PCT US2023 013500, International Search Report mailed Jun. 15, 2023", 4 pgs.

"International Application Serial No. PCT US2023 013500, Written Opinion mailed Jun. 15, 2023", 8 pgs.

Yu, Alex, "pixelNeRF: Neural Radiance Fields from One or Few Images", Proceedings of the IEEE CVF Conference on Computer Vision and Pattern Recognition, (2021), 4578-4587.

* cited by examiner

SCENE CHANGE DETECTION WITH NOVEL VIEW SYNTHESIS

TECHNICAL FIELD

The subject matter disclosed herein generally relates to a visual tracking system. Specifically, the present disclosure addresses systems and methods for detecting changes in a scene using with a visual tracking system.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

The optical sensor in the AR/VR device can also be used to detect changes in a scene (e.g., a physical environment) captured by the same AR/VR device during two distinct sessions. A conventional solution for detecting changes in the scene is to compute a dense three-dimensional (3D) volumetric model from an image sequence from a previous session and from a current session, to align the two 3D reconstructions, and to compare the voxels. This solution often results in 3D reconstruction inaccuracies because its high sensitivity. As such, the system is more likely to detect reconstruction inaccuracies rather than actual changes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
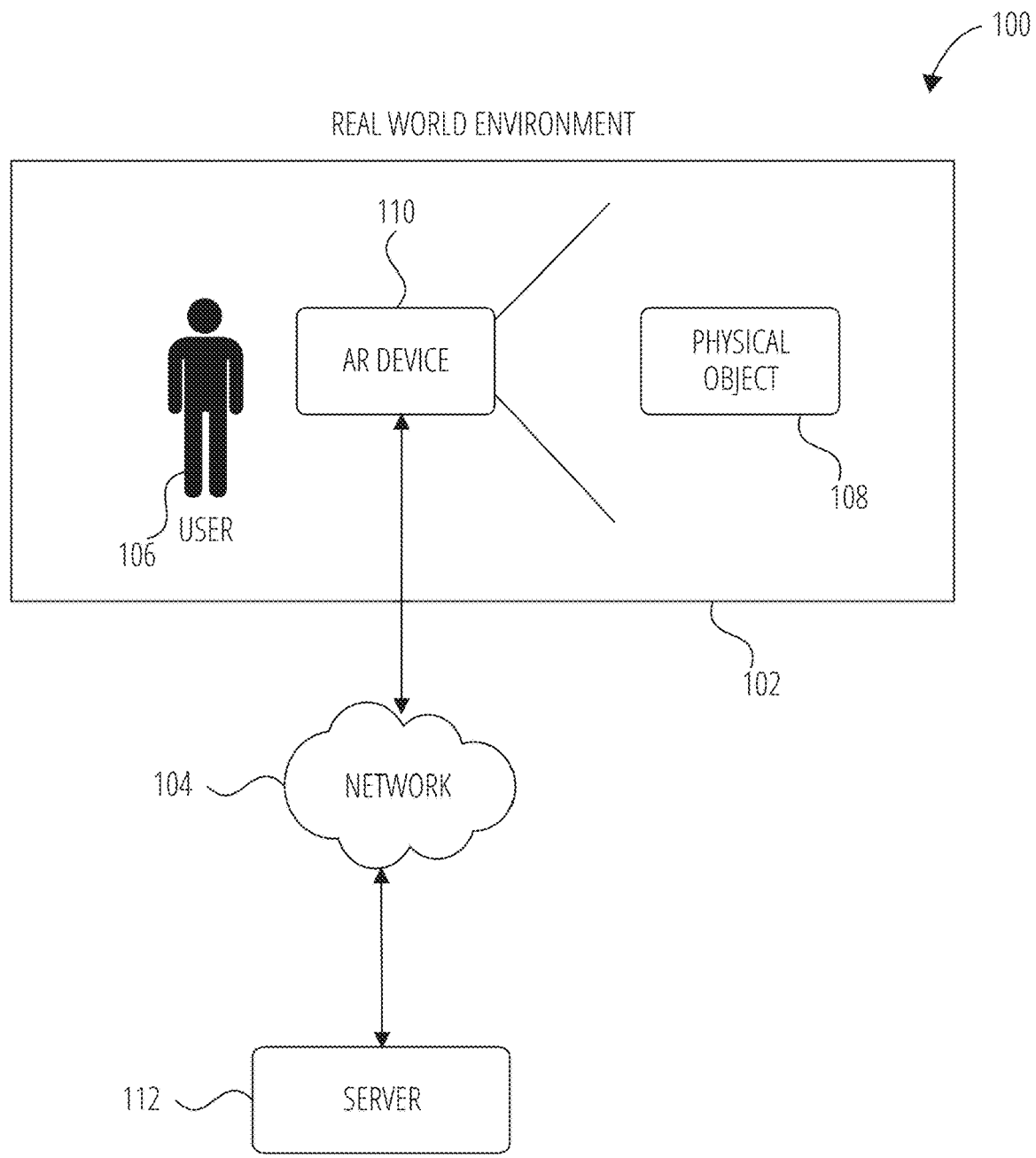
FIG. 1 is a block diagram illustrating a network environment for operating an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The terms "visual tracking system" and "visual tracking device" are used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMTU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a SLAM system or a VIO system that relies on data acquired from multiple sensors (e.g., depth cameras, inertial sensors). The 6DOF tracking system analyzes data from the sensors to accurately determine the pose of the display device.

A "user session" is used herein to refer to an operation of an application during periods of times. For example, a session may refer to an operation of the AR application between the time the user puts on a head-wearable device and the time the user takes off the head-wearable device. In one example, the session starts when the AR device is turned on or is woken up from sleep mode and stops when the AR device is turned off or placed in sleep mode. In another example, the session starts when the user runs or starts the AR application and stops when the user ends the AR application.

A visual tracking device can be used to capture images using a camera of the device during different user sessions. For example, a user wears the AR device and walks around a room during a first session on Monday. The user wears the AR device and walks around the same room during a second session on Tuesday (e.g., a current live stream). The visual tracking device can be used to detect changes in the scene using voxels in a three-dimensional space based on the image data from the AR device. However, detecting changes in a 3D domain is resource intensive and can result in inaccuracies due to sensitivity in the 3D reconstruction of 3D models.

The present application describes a system that detects, in real-time, changes in a scene in a two-dimensional image domain instead of a three-dimensional space. The system first aligns coordinates system of the first session to the second session (e.g., today's live stream) using visual localization (e.g., VSLAM, VIO). The system then applies a neural network pre-trained model (e.g., Neural Radiance Fields models, also referred to as NeRF) that generates a new image (also referred to as a synthetic image) from a few current images at the location of yesterday's spatially closest image. The NeRF model enables the system to generate new images without scene specific training. The system subtracts features (e.g., neural network feature volume instead of RGB values) of a first image from the first session from features of the new image to identify scene changes. In one example, gradients of changes are shown in different colors in a heatmap. The system then displays the heatmap as an overlay to the first image or to the new image.

In one example embodiment, a method for detecting changes in a scene include: accessing a first set of images and corresponding pose data in a first coordinate system associated with a first user session of an augmented reality (AR) device, accessing a second set of images and corresponding pose data in a second coordinate system associated with a second user session of the AR device, aligning the first coordinate system with the second coordinate system based mapping the pose data of the first set of images to the pose data of the second set of images, identifying the first set of images corresponding to a second image from the second set of images based on the pose data of the first set of images being determined spatially closest to the pose data of the second image after aligning the first coordinate system and the second coordinate system, generating, using a trained neural network, a synthesized image from the first set of images, determining differences between features of the second image from features of the synthesized image, and identifying changes based on the differences.

As a result, one or more of the methodologies described herein facilitate solving the technical problem of power consumption saving by detecting changes in feature vectors of two-dimensional images instead of RGB values from a three-dimensional coordinate system. The presently described method provides an improvement to an operation of the functioning of a computer by providing power consumption reduction. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating an AR device 110, according to some example embodiments. The network environment 100 includes an AR device 110 and a server 112, communicatively coupled to each other via a network 104. The AR device 110 and the server 112 may each be implemented in a computer system, in whole or in part, as described below with respect to FIG. 11. The server 112 may be part of a network-based system. For example, the network-based system may be or include a cloud-based server system that provides additional information, such as virtual content (e.g., three-dimensional models of virtual objects) to the AR device 110.

A user 106 operates the AR device 110. The user 106 may be a human user (e.g., a human being), a machine user (e.g., a computer configured by a software program to interact with the AR device 110), or any suitable combination thereof (e.g., a human assisted by a machine or a machine supervised by a human). The user 106 is not part of the network environment 100, but is associated with the AR device 110.

The AR device 110 may be a computing device with a display such as a smartphone, a tablet computer, or a wearable computing device (e.g., watch or glasses). The computing device may be hand-held or may be removable mounted to a head of the user 106. In one example, the display may be a screen that displays what is captured with a camera of the AR device 110. In another example, the display of the device may be transparent such as in lenses of wearable computing glasses. In other examples, the display may be a transparent display such as a windshield of a car, plane, truck. In another example, the display may be non-transparent and wearable by the user to cover the field of vision of the user.

The user 106 operates an application of the AR device 110. The application may include an AR application configured to provide the user 106 with an experience triggered by a physical object 108, such as a two-dimensional physical object (e.g., a picture), a three-dimensional physical object (e.g., a statue), a location (e.g., at factory), or any references (e.g., perceived corners of walls or furniture, QR codes) in the real-world physical environment. For example, the user 106 may point a camera of the AR device 110 to capture an image of the physical object 108.

The AR device 110 includes a tracking system (not shown). The tracking system tracks the pose (e.g., position, orientation, and location) of the AR device 110 relative to the real world environment 102 using optical sensors (e.g., depth-enabled 3D camera, image camera), inertia sensors (e.g., gyroscope, accelerometer), wireless sensors (Bluetooth, Wi-Fi), GPS sensor, and audio sensor to determine the location of the AR device 110 within the real world environment 102.

In one example embodiment, the server 112 may be used to detect and identify the physical object 108 based on sensor data (e.g., image and depth data) from the AR device 110, determine a pose of the AR device 110 and the physical object 108 based on the sensor data. The server 112 can also generate a virtual object based on the pose of the AR device 110 and the physical object 108. The server 112 communicates the virtual object to the AR device 110. The object recognition, tracking, and AR rendering can be performed on either the AR device 110, the server 112, or a combination between the AR device 110 and the server 112.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., AR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
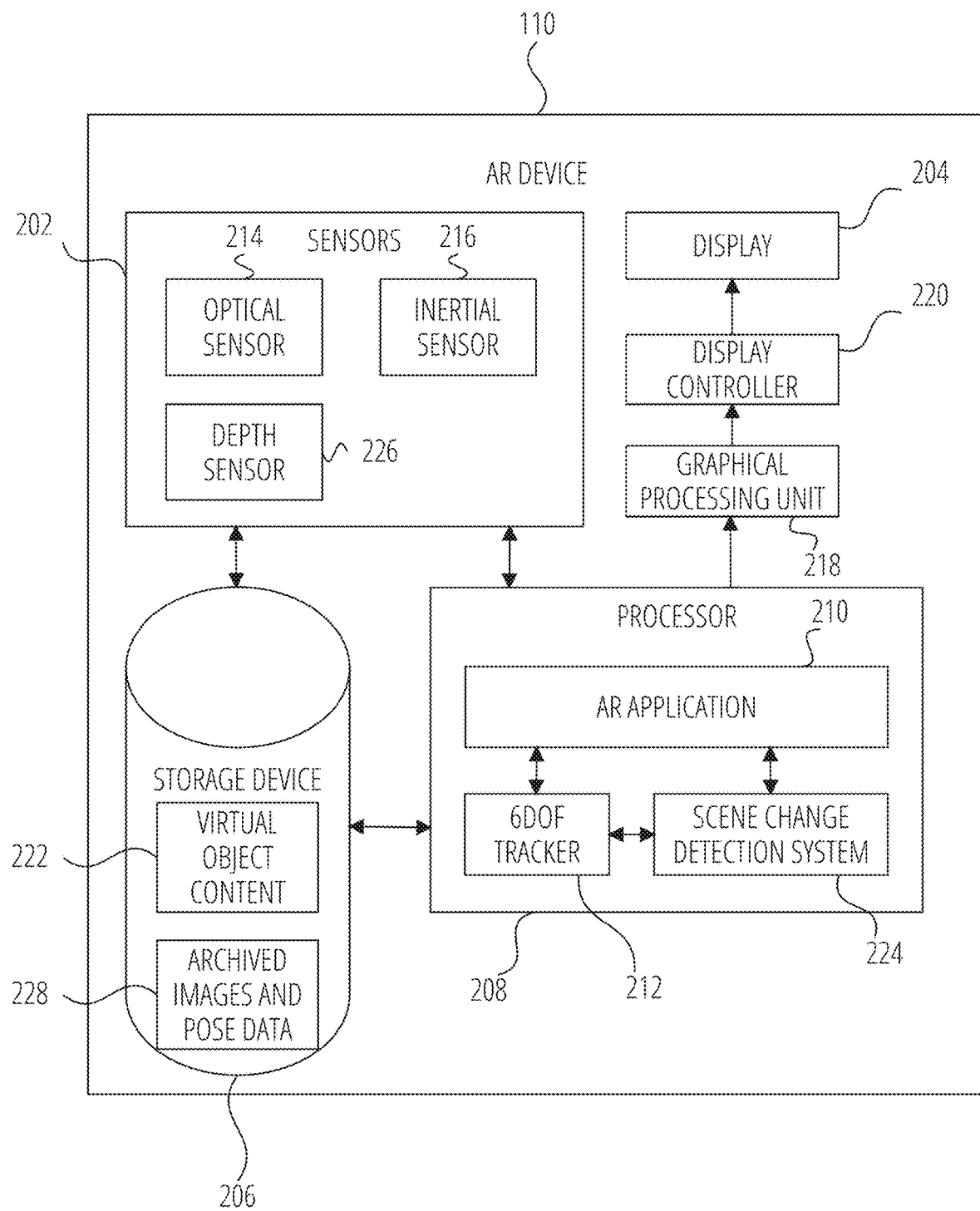
FIG. 2 is a block diagram illustrating an AR device in accordance with one example embodiment.

FIG. 2 is a block diagram illustrating modules (e.g., components) of the AR device 110, according to some example embodiments. The AR device 110 includes sensors 202, a display 204, a processor 208, a Graphical processing unit 218, a display controller 220, and a storage device 206. Examples of AR device 110 include a wearable computing device, a tablet computer, a navigational device, a portable media device, or a smart phone.

The sensors 202 include an optical sensor 214, an inertial sensor 216, and a depth sensor 226. The optical sensor 214 includes combination of a color camera, a thermal camera, a depth sensor, and one or multiple grayscale, global shutter tracking cameras. The inertial sensor 216 includes a combination of gyroscope, accelerometer, magnetometer. The depth sensor 226 includes a combination of structured-light sensor, a time-of-flight sensor, passive stereo sensor, and an ultrasound device, time-of-flight sensor. Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-transparent so that the user 106 can see through the display 204 (in AR use case). In another example, the display 204, such as a LCOS display, presents each frame of virtual content in multiple presentations.

The processor 208 includes an AR application 210, a 6DOF tracker 212, and a scene change detection system 224. The AR application 210 detects and identifies a physical environment or the physical object 108 using computer vision. The AR application 210 retrieves a virtual object (e.g., 3D object model) based on the identified physical object 108 or physical environment. The display 204 displays the virtual object. The AR application 210 includes a local rendering engine that generates a visualization of a virtual object overlaid (e.g., superimposed upon, or otherwise displayed in tandem with) on an image of the physical object 108 captured by the optical sensor 214. A visualization of the virtual object may be manipulated by adjusting a position of the physical object 108 (e.g., its physical location, orientation, or both) relative to the optical sensor 214. Similarly, the visualization of the virtual object may be manipulated by adjusting a pose of the AR device 110 relative to the physical object 108.

The 6DOF tracker 212 estimates a pose of the AR device 110. For example, the 6DOF tracker 212 uses image data and corresponding inertial data from the optical sensor 214 and the inertial sensor 216 to track a location and pose of the AR device 110 relative to a frame of reference (e.g., real world environment 102). In one example, the 6DOF tracker 212 uses the sensor data to determine the three-dimensional pose of the AR device 110. The three-dimensional pose is a determined orientation and position of the AR device 110 in relation to the user's real world environment 102. For example, the AR device 110 may use images of the user's real world environment 102, as well as other sensor data to identify a relative position and orientation of the AR device 110 from physical objects in the real world environment 102 surrounding the AR device 110. The 6DOF tracker 212 continually gathers and uses updated sensor data describing movements of the AR device 110 to determine updated three-dimensional poses of the AR device 110 that indicate changes in the relative position and orientation of the AR device 110 from the physical objects in the real world environment 102. The 6DOF tracker 212 provides the three-dimensional pose of the AR device 110 to the Graphical processing unit 218

The Graphical processing unit 218 includes a render engine (not shown) that is configured to render a frame of a 3D model of a virtual object based on the virtual content provided by the AR application 210 and the pose of the AR device 110. In other words, the Graphical processing unit 218 uses the three-dimensional pose of the AR device 110 to generate frames of virtual content to be presented on the display 204. For example, the Graphical processing unit 218 uses the three-dimensional pose to render a frame of the virtual content such that the virtual content is presented at an orientation and position in the display 204 to properly augment the user's reality. As an example, the Graphical processing unit 218 may use the three-dimensional pose data to render a frame of virtual content such that, when presented on the display 204, the virtual content overlaps with a physical object in the user's real world environment 102. The Graphical processing unit 218 generates updated frames of virtual content based on updated three-dimensional poses of the AR device 110, which reflect changes in the position and orientation of the user in relation to physical objects in the user's real world environment 102.

The Graphical processing unit 218 transfers the rendered frame to the display controller 220. The display controller 220 is positioned as an intermediary between the Graphical processing unit 218 and the display 204, receives the image data (e.g., rendered frame) from the Graphical processing unit 218 re-projects the frame (by performing a warping process) based on a latest pose of the AR device 110, and provides the reprojected frame to the display 204.

The scene change detection system 224 accesses a live stream from a current session. For example, the scene change detection system 224 retrieves images from the optical sensor 214 and corresponding pose data from the 6DOF tracker 212. The scene change detection system 224 uses the pose data from the current session to access archived images and pose data 228 from a previous session. The archived images and pose data 228 may be stored in the storage device 206. For example, the scene change detection system 224 identifies a set of current images from the current session at the location of the previous session's spatially closest image. In another example, the scene change detection system 224 identifies a set of archived images from the previous session at the location of the current session's spatially closest image. In one example, the scene change detection system 224 aligns the coordinate system of the current session with the coordinate of the previous session using the visualization localization data (e.g., pose data) from the AR device 110. As such, the scene change detection system 224 can compare the trajectory of the AR device 110 in the current session with the trajectory of the AR device 110 from yesterday's session in a same frame of reference (e.g., coordinate system). In another example, the scene change detection system 224 calls on the functions of the 6DOF tracker 212 to perform aligning the coordinate system.

The scene change detection system 224 applies a generalized NeRF based neural network model to generate a new synthetic image from a few images of the current session at the location of the previous session spatially closest image. In another example, the scene change detection system 224 applies the generalized NeRF based neural network model to generate a new synthetic image from a few images of the previous session at the location of the current session spatially closest image.

The scene change detection system 224 subtracts neural network feature volumes (instead of RGB values) to determine changes in the scene. In one example, the scene change detection system 224 generates a heatmap where the color gradients change based on the values of the subtracted features in a two-dimensional domain. The scene change detection system 224 causes the display 204 to display the heatmap as an overlay corresponding to the live stream image from optical sensor 214.

The storage device 206 stores virtual object content 222 and archived images and pose data 228. The virtual object content 222 includes, for example, a database of visual references (e.g., images, QR codes) and corresponding virtual content (e.g., three-dimensional model of virtual objects).

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
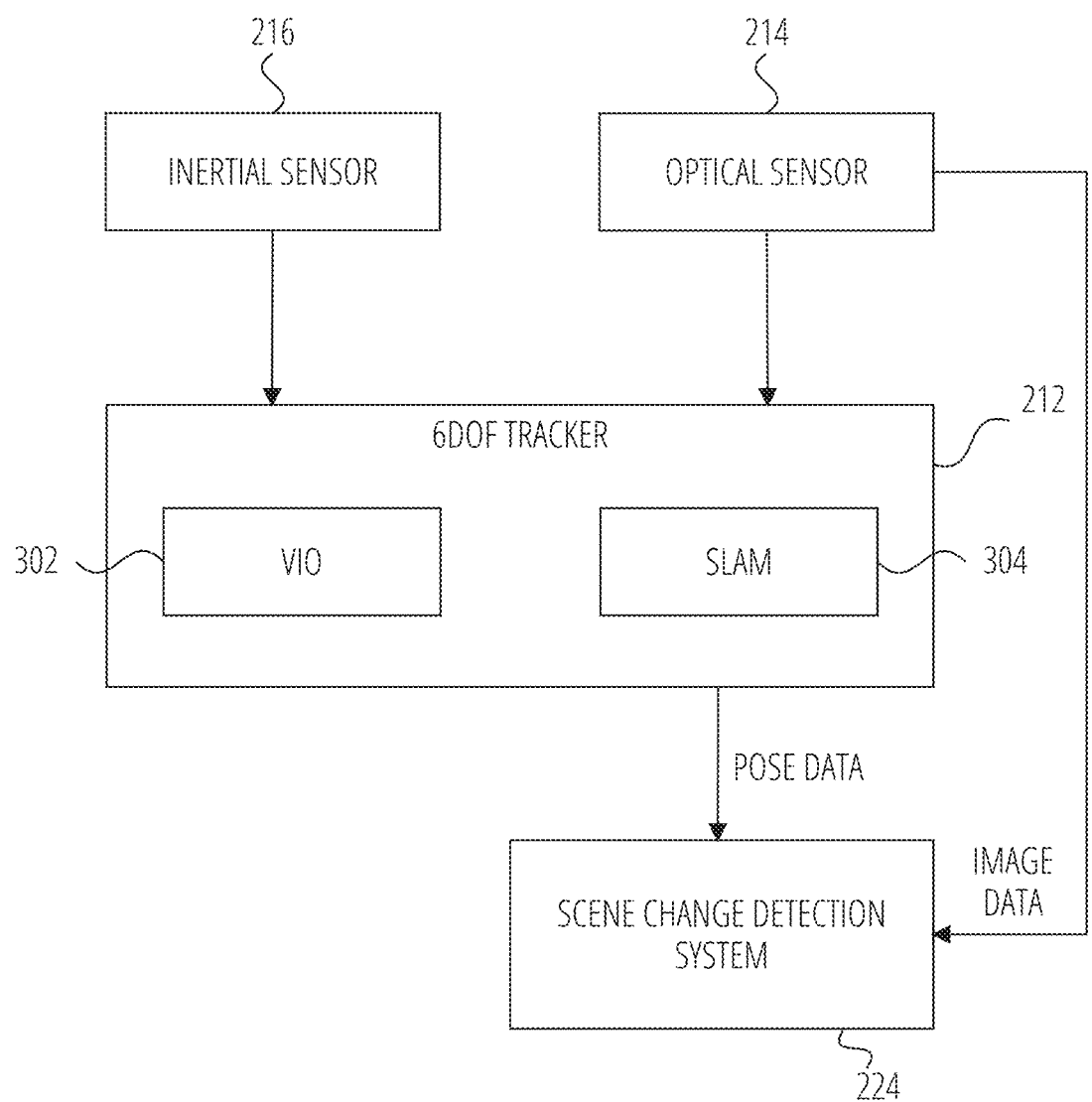
FIG. 3 is a block diagram illustrating a 6DOF tracker in accordance with one example embodiment.

FIG. 3 is a block diagram illustrating a 6DOF tracker 212 in accordance with one example embodiment. The 6DOF tracker 212 accesses inertial sensor data from the inertial sensor 216 and optical sensor data from the optical sensor 214.

The 6DOF tracker 212 determines a pose (e.g., location, position, orientation, inclination) of the AR device 110 relative to a frame of reference (e.g., real world environment 102). In one example embodiment, the 6DOF tracker 212 includes a VIO 302 and a SLAM 304. The 6DOF tracker 212 estimates the pose of the AR device 110 based on 3D maps of feature points from images captured with the optical sensor 214 and the inertial sensor data captured with the inertial sensor 216. The The 6DOF tracker 212 provides pose data to the scene change detection system 224. The optical sensor 214 provides image data (e.g., a live stream image) to the scene change detection system 224. The scene change detection system 224 uses the pose data align the coordinate systems from the current session with the previous session. For example, the scene change detection system 224 uses the pose data to compare the trajectories of the current session and the previous session in a same coordinate system. The scene change detection system 224 maps and identifies corresponding images from the current session with images from the previous session using the pose data from the aligned coordinate system.

Figure 4:
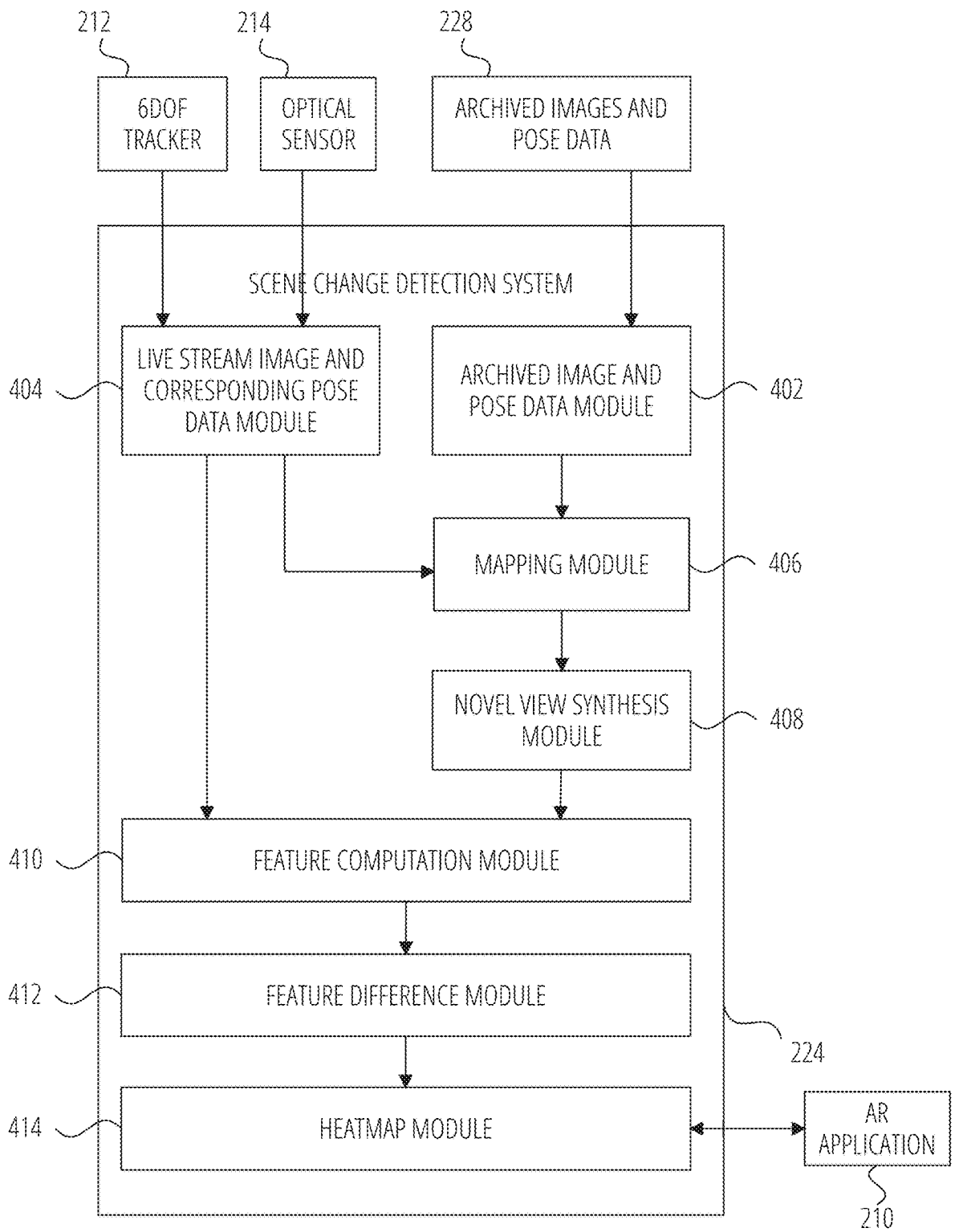
FIG. 4 illustrates a scene change detection system in accordance with one example embodiment.

FIG. 4 illustrates the scene change detection system 224 in accordance with one example embodiment. The scene change detection system 224 includes an archived image and pose data module 402, a live stream image and corresponding pose data module 404, a mapping module 406, a novel view synthesis module 408, a feature computation module 410, a feature difference module 412, and a heatmap module 414.

The live stream image and corresponding pose data module 404 accesses a live stream image from the optical sensor 214 and corresponding pose data from 6DOF tracker 212. In one example, the live stream image and corresponding pose data module 404 accesses a plurality of image frames from the current session from the optical sensor 214 and corresponding pose data from the 6DOF tracker 212.

The archived image and pose data module 402 retrieves archived images and pose data 228 from the storage device 206. In one example, the archived images and pose data 228 correspond to a previous session from the same or other user wearing the same or different AR device 110. In another example, the archived image and pose data module 402 identifies that the pose data from the current session identifies a specific location (e.g., conference room A). The archived image and pose data module 402 retrieves images previously captured by the AR device 110 at the same conference room A during a previous session.

The mapping module 406 maps an image from the current session to an image from the previous session. For example, the mapping module 406 maps the images such that features/pixels in a current image correspond to features in an archived image after aligning the two-dimensional coordinates from the current session with the previous session. In one example, the mapping module 406 determines the trajectory of the AR device 110 in the current session based on the pose data of the AR device 110 in the current session and compares it to the trajectory of the AR device 110 in a previous session based on the pose data of the 110 in the previous session.

The novel view synthesis module 408 generates a composite image (e.g., a synthetic image) based on pose data from a current session or from a previous session. For example, the novel view synthesis module 408 applies a generalized NeRF-based neural network model (that is pre-trained but not with specific scenes, such as conference room A) to a few images from the current session at the location of the previous session spatially closest image to generate the synthetic image. In another example, the novel view synthesis module 408 applies the generalized NeRF-based neural network model to a few images from the previous session at the location of the current session spatially closest image to generate the synthetic image. The synthetic image represents an image from a session based on a pose data different from the pose data of the session. In other words, the novel view synthesis module 408 generates a new image from a new view/perspective (e.g., different from the existing trajectory) of the AR device 110.

The feature computation module 410 computes features (e.g., gradient, variance, mean of pixel and surrounding regions) from the synthetic image or accesses features native to the generalized NeRF-based neural network model (e.g., feature vector). In another example, the feature computation module 410 computes features from a reference image of a current session or previous session.

The feature difference module 412 determines a difference between features of the reference image from features of the synthetic image. In one example, the feature difference module 412 subtracts features of an image of a previous session with features of the synthetic image. In another example, the feature difference module 412 subtracts features of an image of a current session from features of the synthetic image. In another example, the feature difference module 412 computes the difference of the two vectors (one typically subtracts component-wise the numbers and sum the differences up). Other ways to measure the difference include measuring an angle differences of two feature vectors.

The heatmap module 414 determines gradient values based on the computed subtraction of features from the feature difference module 412. The heatmap module 414 generates a heatmap based on the gradient values of each pixel in the two-dimensional domain of the synthetic image. The heatmap includes different colors assigned to different gradient values to identify an intensity of changes in a scene/image. The heatmap module 414 provides the heatmap to the AR application 210. The AR application 210 displays the heatmap in the display 204 so that the heatmap appears as an overlay.

Figure 5:
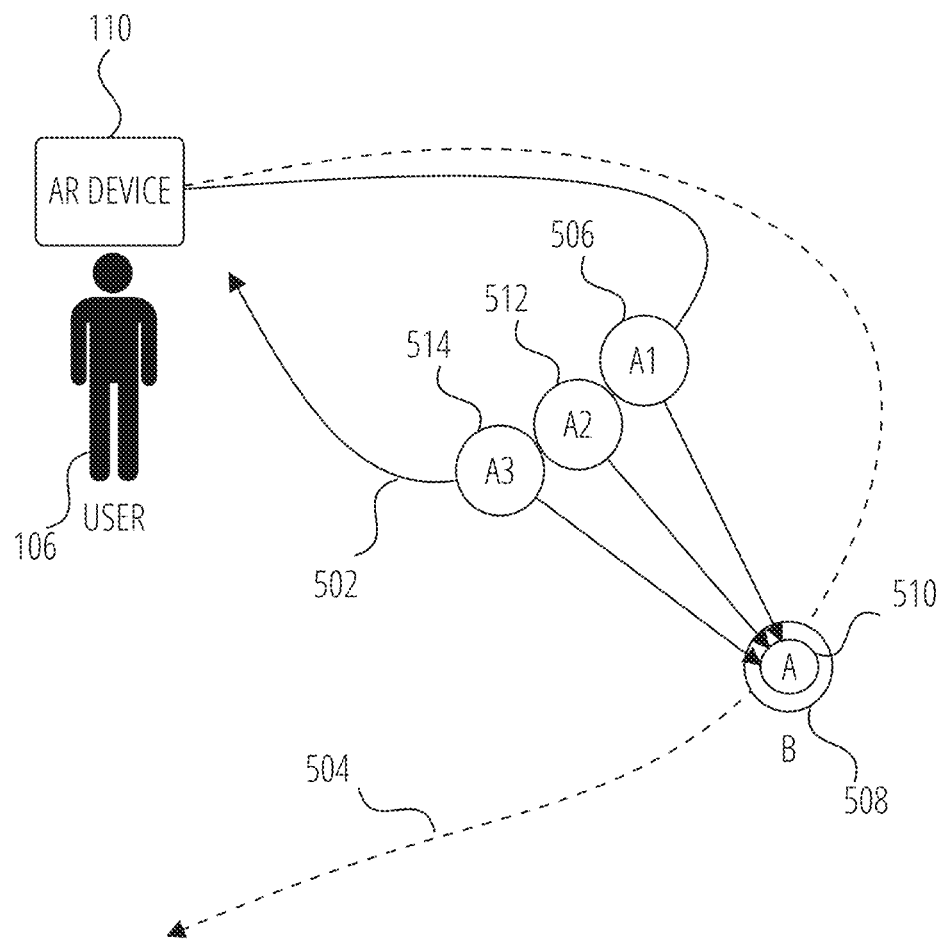
FIG. 5 illustrates example trajectories of the AR device in accordance with one example embodiment.

FIG. 5 illustrates example trajectories of the AR device 110 in accordance with one example embodiment. The user 106 wears the AR device 110 and walks along a trajectory 502 in a current session. The scene change detection system 224 identifies a trajectory 504 of the AR device 110 in a previous session (e.g., a session immediately prior to the current session).

The scene change detection system 224 first aligns the trajectory 502 with the trajectory 504 using a same frame of reference or coordinate system using the 6DOF tracker 212. The scene change detection system 224 identifies a set of images (e.g., image A1 506, image A2 512, image A3 514) from a current location of the user 106 along the trajectory 502 where the pose data from the set of images indicate that the AR device 110 is closest to a location of image B 508 of the AR device 110 from the previous session. The scene change detection system 224 generates a synthetic image (e.g., synthetic image A 510) corresponding to the pose data of image B 508.

Figure 6:
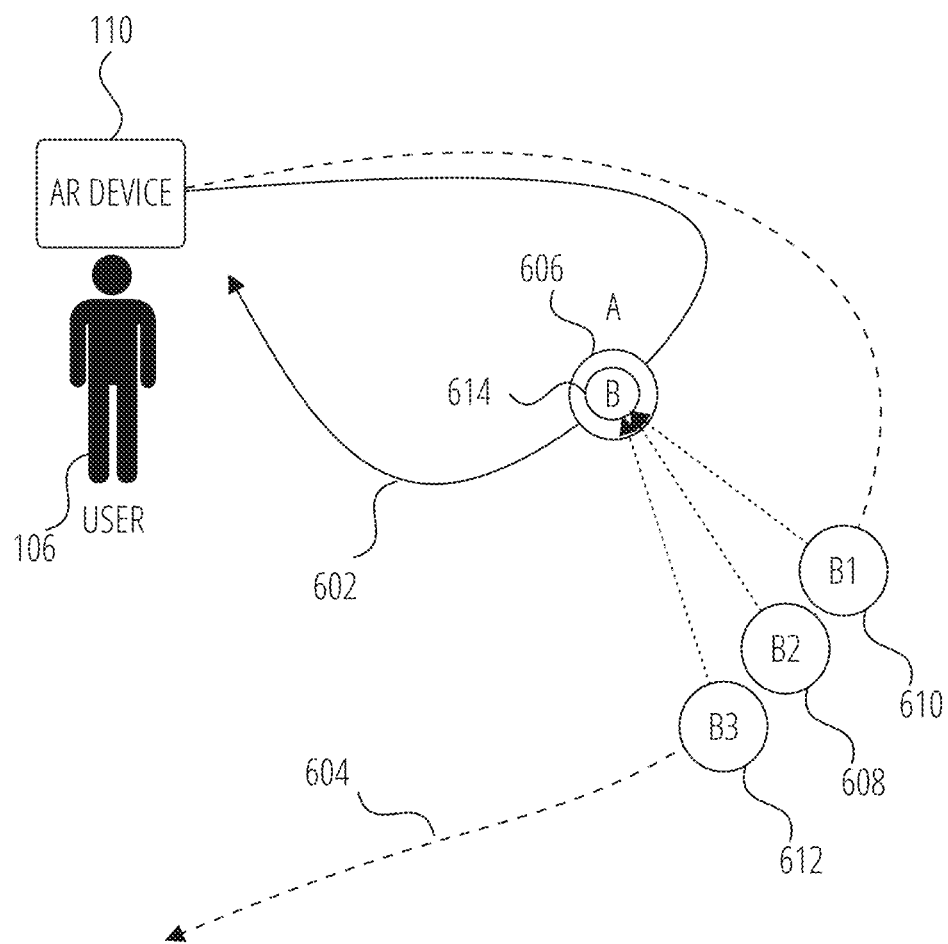
FIG. 6 illustrates example trajectories of the AR device in accordance with one example embodiment.

FIG. 6 illustrates example trajectories of the AR device 110 in accordance with one example embodiment. The user 106 wears the AR device 110 and walks along a trajectory 602 in a current session. The scene change detection system 224 identifies a trajectory 604 of the AR device 110 in a previous session (e.g., a session immediately prior to the current session).

The scene change detection system 224 first aligns the trajectory 602 with the trajectory 604 using a same frame of reference or coordinate system using the 6DOF tracker 212. The scene change detection system 224 identifies a set of images (e.g., image B1 610, image B2 608, image B3 612) from a previous location of the AR device 110 along the trajectory 604 where the pose data from the set of images indicate that the AR device 110 is closest to a location of image A 606 of the AR device 110 from the current session. The scene change detection system 224 generates a synthetic image (e.g., synthetic image B 614 510) corresponding to the pose data of image A 606.

Figure 7:
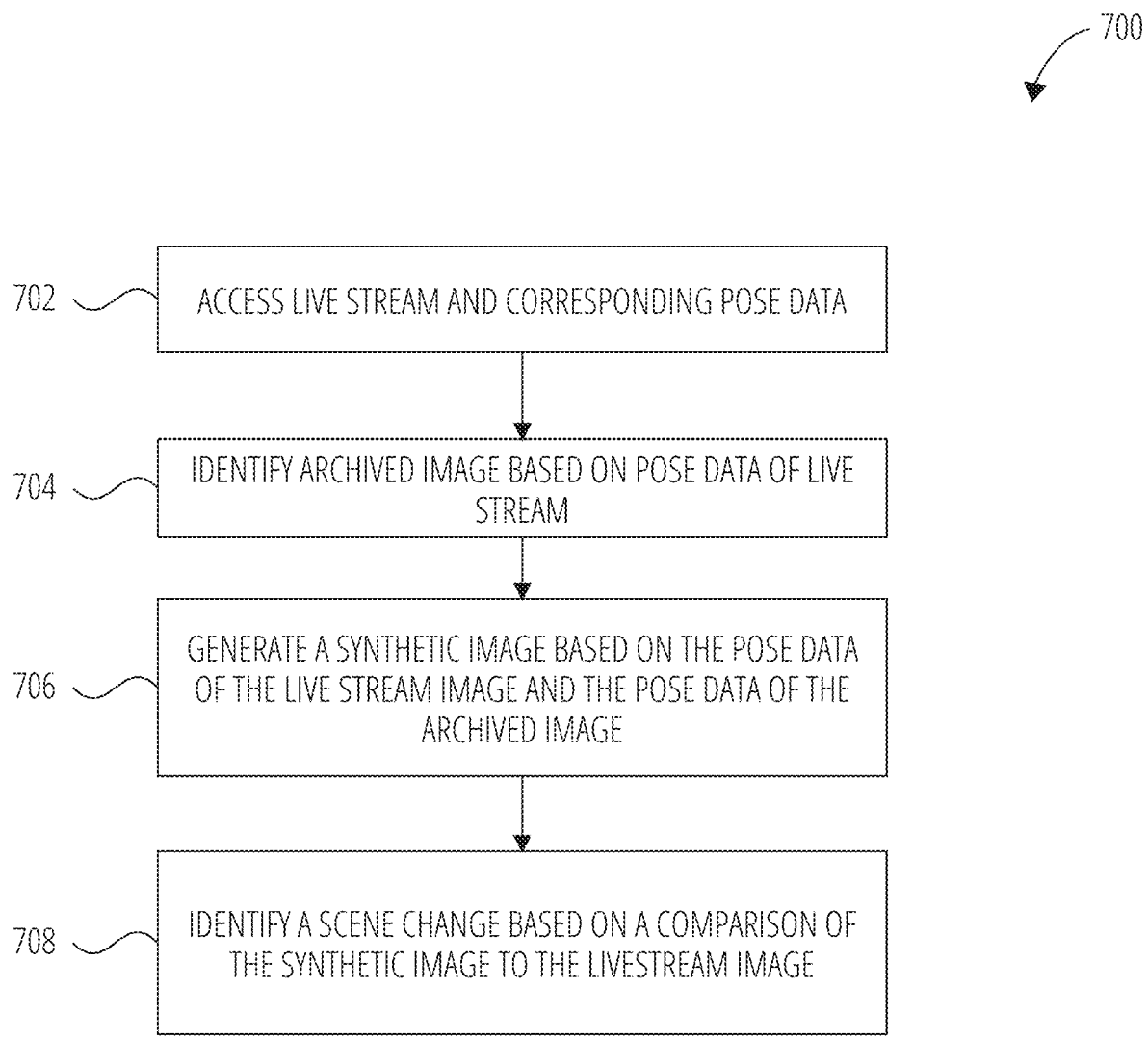
FIG. 7 is a flow diagram illustrating a method for identifying a scene change in accordance with one example embodiment.

FIG. 7 is a flow diagram illustrating a method 700 for detecting changes in a scene in accordance with one example embodiment. Operations in the method 700 may be performed by the scene change detection system 224, using components (e.g., modules, engines) described above with respect to FIG. 4. Accordingly, the method 700 is described by way of example with reference to the scene change detection system 224. However, it shall be appreciated that at least some of the operations of the method 700 may be deployed on various other hardware configurations or be performed by similar components residing elsewhere.

In block 702, the live stream image and corresponding pose data module 404 access live stream and corresponding pose data. In block 704, the archived image and pose data module 402 identifies archived image based on pose data of live stream. In block 706, the novel view synthesis module 408 generates a synthetic image based on the pose data of the live stream image and the pose data of the archived image. In block 708, the feature difference module 412 identifies a scene change based on a comparison of the synthesized image to the livestream image.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
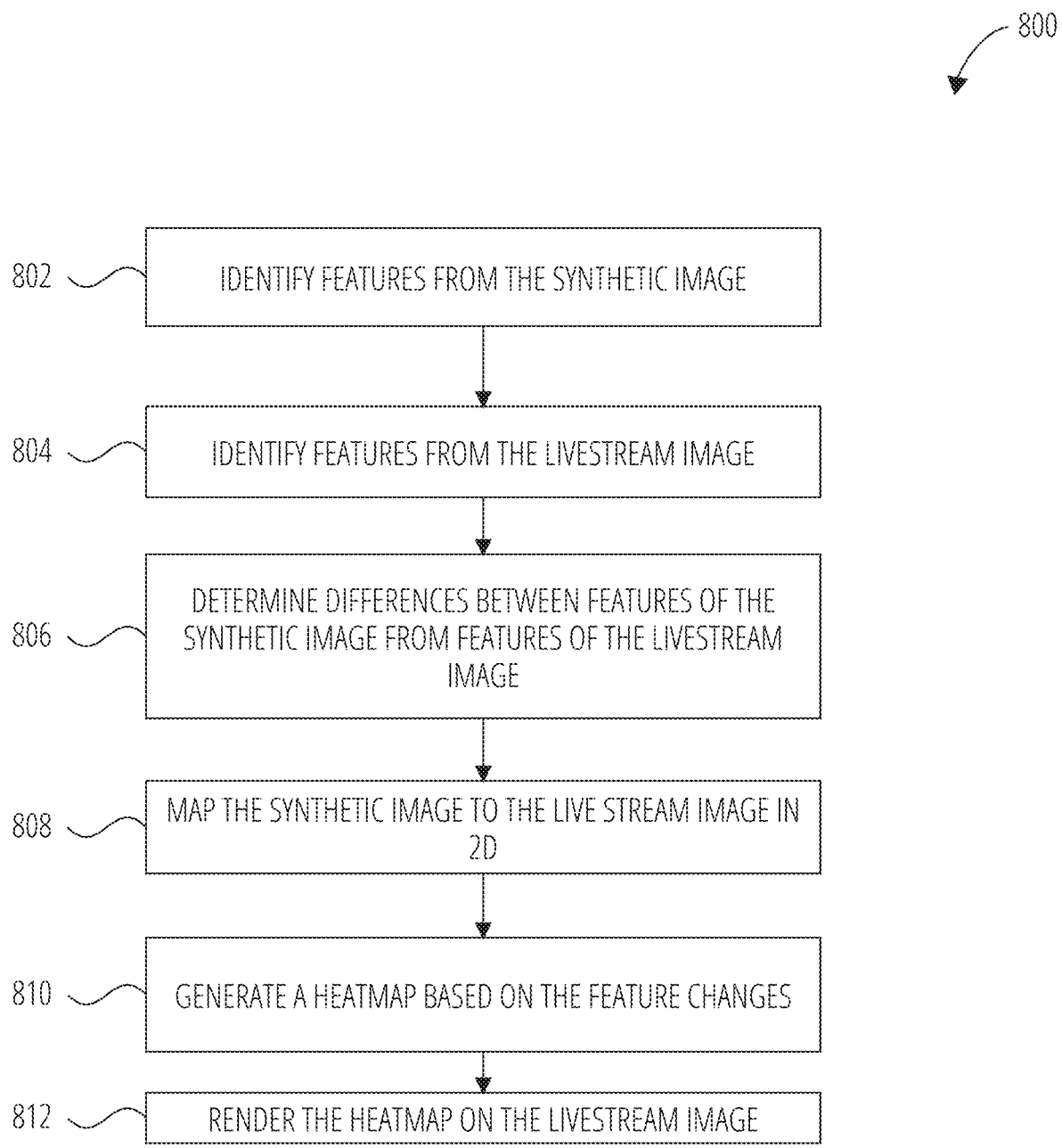
FIG. 8 is a flow diagram illustrating a method for rendering a heatmap in accordance with one example embodiment.

FIG. 8 is a flow diagram illustrating a method 800 for rendering a heatmap in accordance with one example embodiment. Operations in the method 800 may be performed by the scene change detection system 224, using components (e.g., modules, engines) described above with respect to FIG. 4. Accordingly, the method 800 is described by way of example with reference to the scene change detection system 224. However, it shall be appreciated that at least some of the operations of the method 800 may be deployed on various other hardware configurations or be performed by similar components residing elsewhere.

In block 802, the feature computation module 410 identifies features from the synthetic image. In block 804, the feature computation module 410 identifies features from the livestream image. In block 806, the feature difference module 412 determines differences in the (2D) vectors of the features of the synthesized image from features of the livestream image. In block 808, the feature difference module 412 maps the synthetic image to the live stream image in 2D. In block 810, the heatmap module 414 generates a heatmap based on the feature changes. In block 812, the AR application 210 renders the heatmap on the livestream image.

System with Head-Wearable Apparatus

Figure 9:
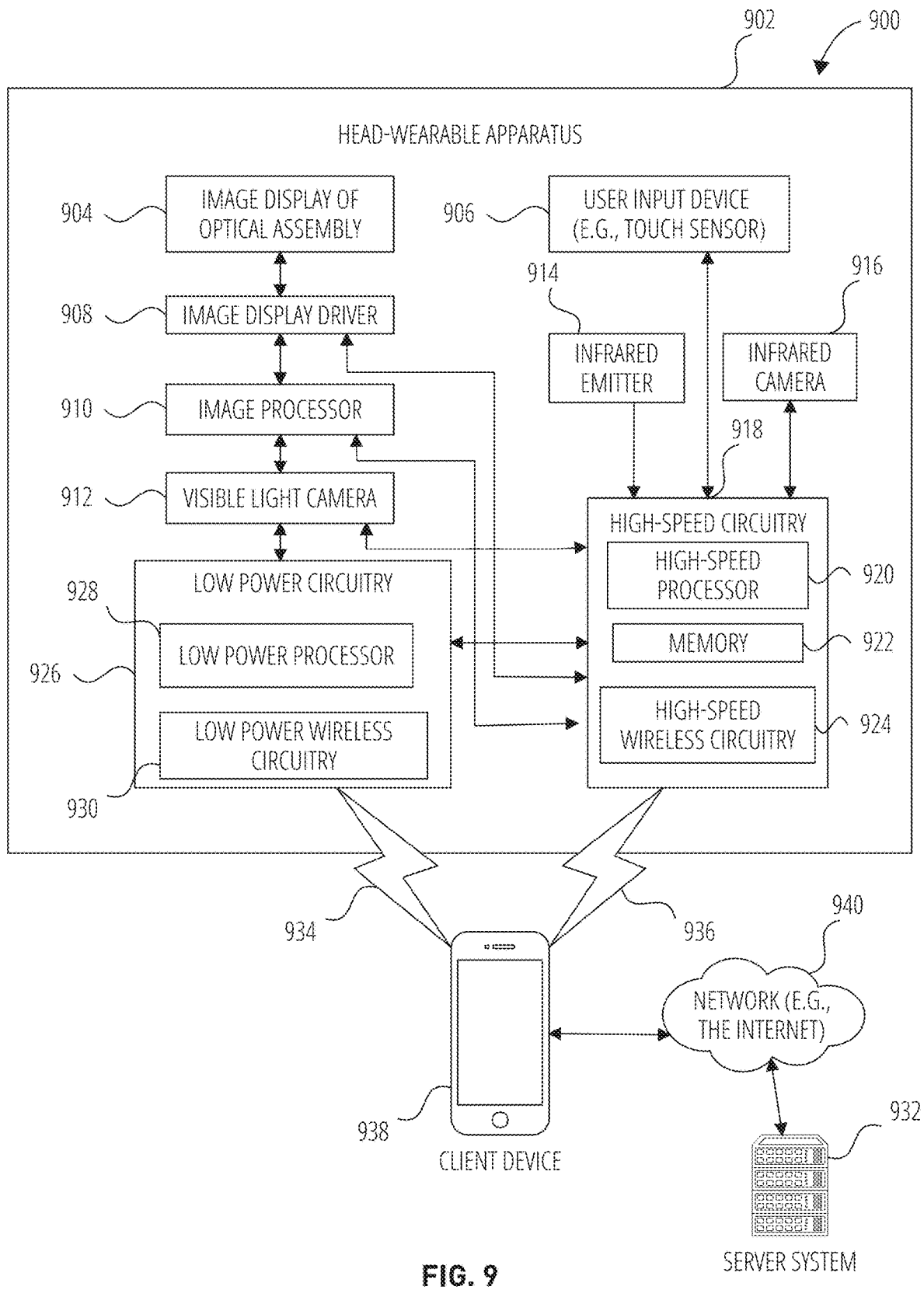
FIG. 9 illustrates a network environment in which a head-wearable device can be implemented according to one example embodiment.

FIG. 9 illustrates a network environment 900 in which the head-wearable apparatus 902 can be implemented according to one example embodiment. FIG. 9 is a high-level functional block diagram of an example head-wearable apparatus 902 communicatively coupled a mobile client device 938 and a server system 932 via various network 940.

head-wearable apparatus 902 includes a camera, such as at least one of visible light camera 912, infrared emitter 914 and infrared camera 916. The client device 938 can be capable of connecting with head-wearable apparatus 902 using both a communication 934 and a communication 936. client device 938 is connected to server system 932 and network 940. The network 940 may include any combination of wired and wireless connections.

The head-wearable apparatus 902 further includes two image displays of the image display of optical assembly 904. The two include one associated with the left lateral side and one associated with the right lateral side of the head-wearable apparatus 902. The head-wearable apparatus 902 also includes image display driver 908, image processor 910, low-power low power circuitry 926, and high-speed circuitry 918. The image display of optical assembly 904 are for presenting images and videos, including an image that can include a graphical user interface to a user of the head-wearable apparatus 902.

The image display driver 908 commands and controls the image display of the image display of optical assembly 904. The image display driver 908 may deliver image data directly to the image display of the image display of optical assembly 904 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exit) or the like.

As noted above, head-wearable apparatus 902 includes a frame and stems (or temples) extending from a lateral side of the frame. The head-wearable apparatus 902 further includes a user input device 906 (e.g., touch sensor or push button) including an input surface on the head-wearable apparatus 902. The user input device 906 (e.g., touch sensor or push button) is to receive from the user an input selection to manipulate the graphical user interface of the presented image.

The components shown in FIG. 9 for the head-wearable apparatus 902 are located on one or more circuit boards, for example a PCB or flexible PCB, in the rims or temples. Alternatively, or additionally, the depicted components can be located in the chunks, frames, hinges, or bridge of the head-wearable apparatus 902. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. memory 922 can also include storage device.

As shown in FIG. 9, high-speed circuitry 918 includes high-speed processor 920, memory 922, and high-speed wireless circuitry 924. In the example, the image display driver 908 is coupled to the high-speed circuitry 918 and operated by the high-speed processor 920 in order to drive the left and right image displays of the image display of optical assembly 904. high-speed processor 920 may be any processor capable of managing high-speed communications and operation of any general computing system needed for head-wearable apparatus 902. The high-speed processor 920 includes processing resources needed for managing high-speed data transfers on communication 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or WiFi). The client device 938, including the transceivers communicating via the communication 934 and communication 936, may be implemented using details of the architecture of the head-wearable apparatus 902, as can other elements of network 940.

The memory 922 includes any storage device capable of storing various data and applications, including, among other things, camera data generated by the left and right, infrared camera 916, and the image processor 910, as well as images generated for display by the image display driver 908 on the image displays of the image display of optical assembly 904. While memory 922 is shown as integrated with high-speed circuitry 918, in other examples, memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (visible light camera 912; infrared emitter 914, or infrared camera 916), the image display driver 908, the user input device 906 (e.g., touch sensor or push button), and the memory 922.

The head-wearable apparatus 902 is connected with a host computer. For example, the head-wearable apparatus 902 is paired with the client device 938 via the communication 936 or connected to the server system 932 via the network 940. server system 932 may be one or more computing devices as part of a service or network computing system, for example, that include a processor, a memory, and network communication interface to communicate over the network 940 with the client device 938 and head-wearable apparatus 902.

The client device 938 includes a processor and a network communication interface coupled to the processor. The network communication interface allows for communication over the network 940, communication 934 or communication 936. client device 938 can further store at least portions of the instructions for generating a binaural audio content in the client device 938's memory to implement the functionality described herein.

Output components of the head-wearable apparatus 902 include visual components, such as a display such as a liquid crystal display (LCD), a plasma display panel (PDP), a light emitting diode (LED) display, a projector, or a waveguide. The image displays of the optical assembly are driven by the image display driver 908. The output components of the head-wearable apparatus 902 further include acoustic components (e.g., speakers), haptic components (e.g., a vibratory motor), other signal generators, and so forth. The input components of the head-wearable apparatus 902, the client device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with head-wearable apparatus 902. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 936 from the client device 938 via the low power wireless circuitry 930 or high-speed wireless circuitry 924.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 10:
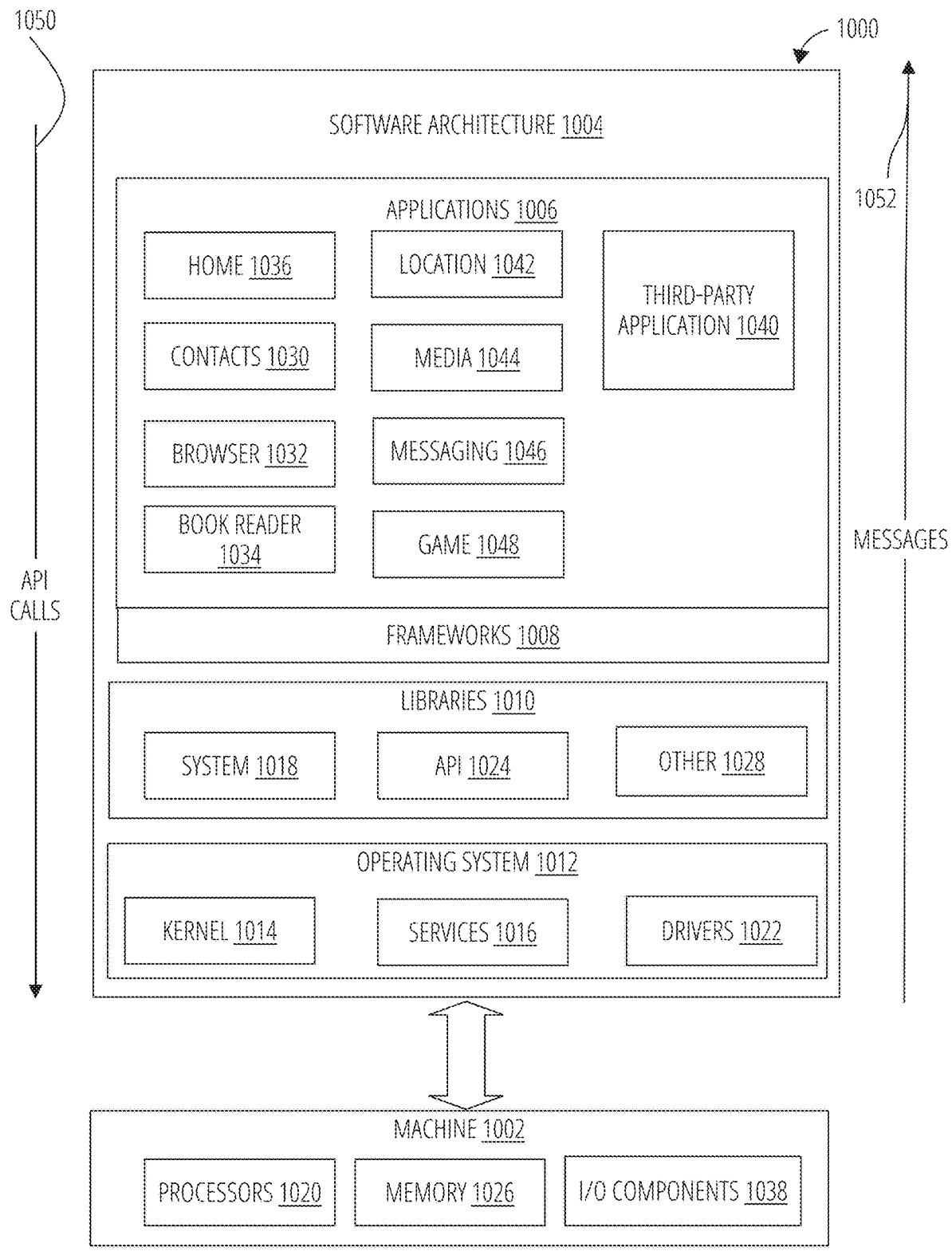
FIG. 10 is block diagram showing a software architecture within which the present disclosure may be implemented, according to an example embodiment.

FIG. 10 is a block diagram 1000 illustrating a software architecture 1004, which can be installed on any one or more of the devices described herein. The software architecture 1004 is supported by hardware such as a machine 1002 that includes Processors 1020, memory 1026, and I/O Components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), Component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH®) Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
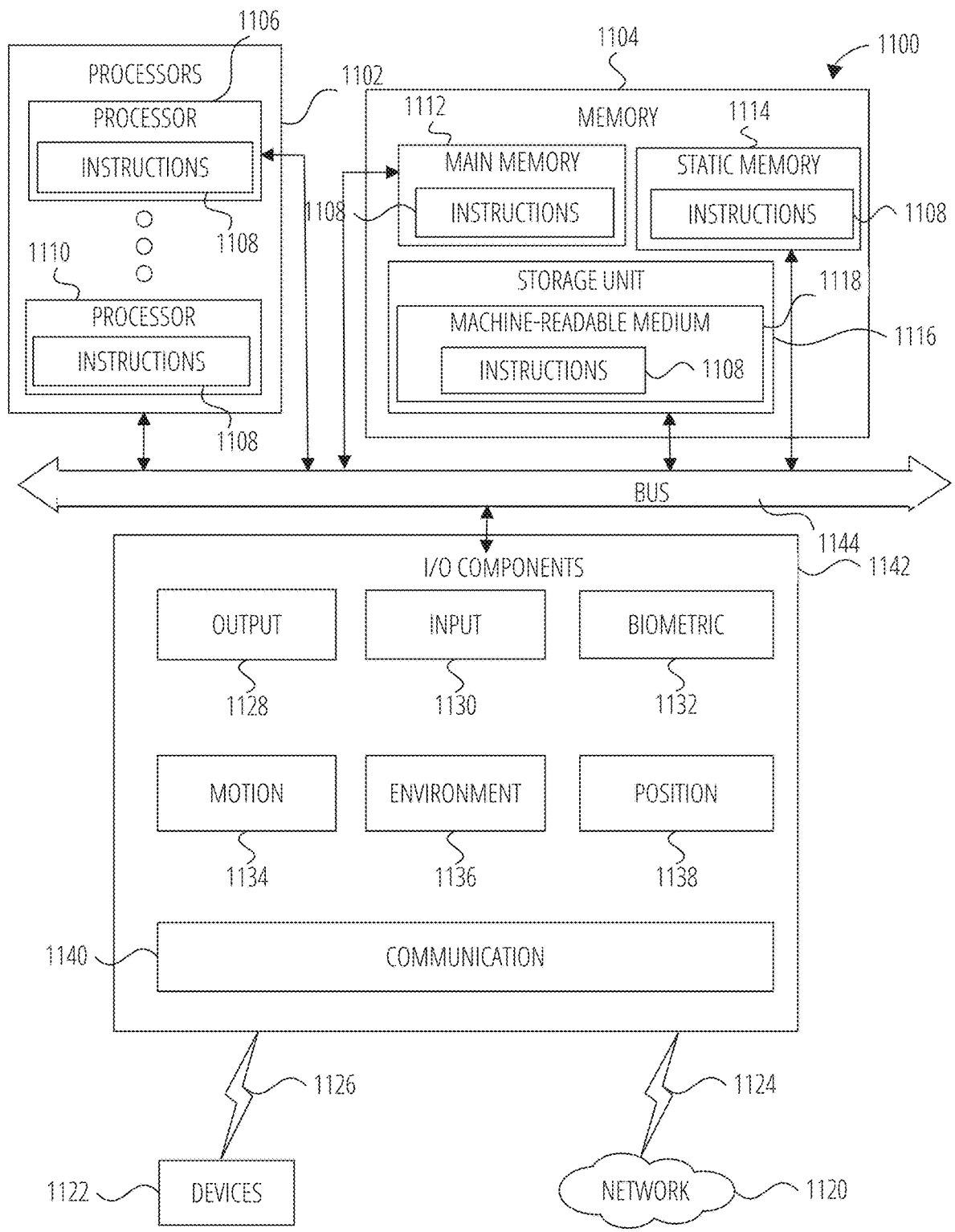
FIG. 11 is a diagrammatic representation of a machine in the form of a computer system within which a set of instructions may be executed for causing the machine to perform any one or more of the methodologies discussed herein, according to one example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include Processors 1102, memory 1104, and I/O Components 1142, which may be configured to communicate with each other via a bus 1144. In an example embodiment, the Processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core Processors that may comprise two or more independent Processors (sometimes referred to as "cores") that may execute instructions contemporaneously. Although FIG. 11 shows multiple Processors 1102, the machine 1100 may include a single Processor with a single core, a single Processor with multiple cores (e.g., a multi-core Processor), multiple Processors with a single core, multiple Processors with multiples cores, or any combination thereof.

The memory 1104 includes a main memory 1112, a static memory 1114, and a storage unit 1116, both accessible to the Processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the Processors 1102 (e.g., within the Processor's cache memory), or any suitable combination thereof, during execution thereof by the machine 1100.

The I/O Components 1142 may include a wide variety of Components to receive input, provide output, produce output, transmit information, exchange information, capture measurements, and so on. The specific I/O Components 1142 that are included in a particular machine will depend on the type of machine. For example, portable machines such as mobile phones may include a touch input device or other such input mechanisms, while a headless server machine will likely not include such a touch input device. It will be appreciated that the I/O Components 1142 may include many other Components that are not shown in FIG. 11. In various example embodiments, the I/O Components 1142 may include output Components 1128 and input Components 1130. The output Components 1128 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1130 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1142 may include biometric Components 1132, motion Components 1134, environmental Components 1136, or position Components 1138, among a wide array of other Components. For example, the biometric Components 1132 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1134 include acceleration sensor Components (e.g., accelerometer), gravitation sensor Components, rotation sensor Components (e.g., gyroscope), and so forth. The environmental Components 1136 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1138 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1142 further include communication Components 1140 operable to couple the machine 1100 to a network 1120 or devices 1122 via a coupling 1124 and a coupling 1126, respectively. For example, the communication Components 1140 may include a network interface Component or another suitable device to interface with the network 1120. In further examples, the communication Components 1140 may include wired communication Components, wireless communication Components, cellular communication Components, Near Field Communication (NFC) Components, Bluetooth Components (e.g., Bluetooth Low Energy), Wi-Fi© Components, and other communication Components to provide communication via other modalities. The devices 1122 may be another machine or any of a wide variety of peripheral devices (e.g., a peripheral device coupled via a USB).

Moreover, the communication Components 1140 may detect identifiers or include Components operable to detect identifiers. For example, the communication Components 1140 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the Processors 1102) and/or storage unit 1116 may store one or more sets of instructions and data structures (e.g., software) embodying or used by any one or more of the methodologies or functions described herein. These instructions (e.g., the instructions 1108), when executed by Processors 1102, cause various operations to implement the disclosed embodiments.

The instructions 1108 may be transmitted or received over the network 1120, using a transmission medium, via a network interface device (e.g., a network interface Component included in the communication Components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Figure 12:
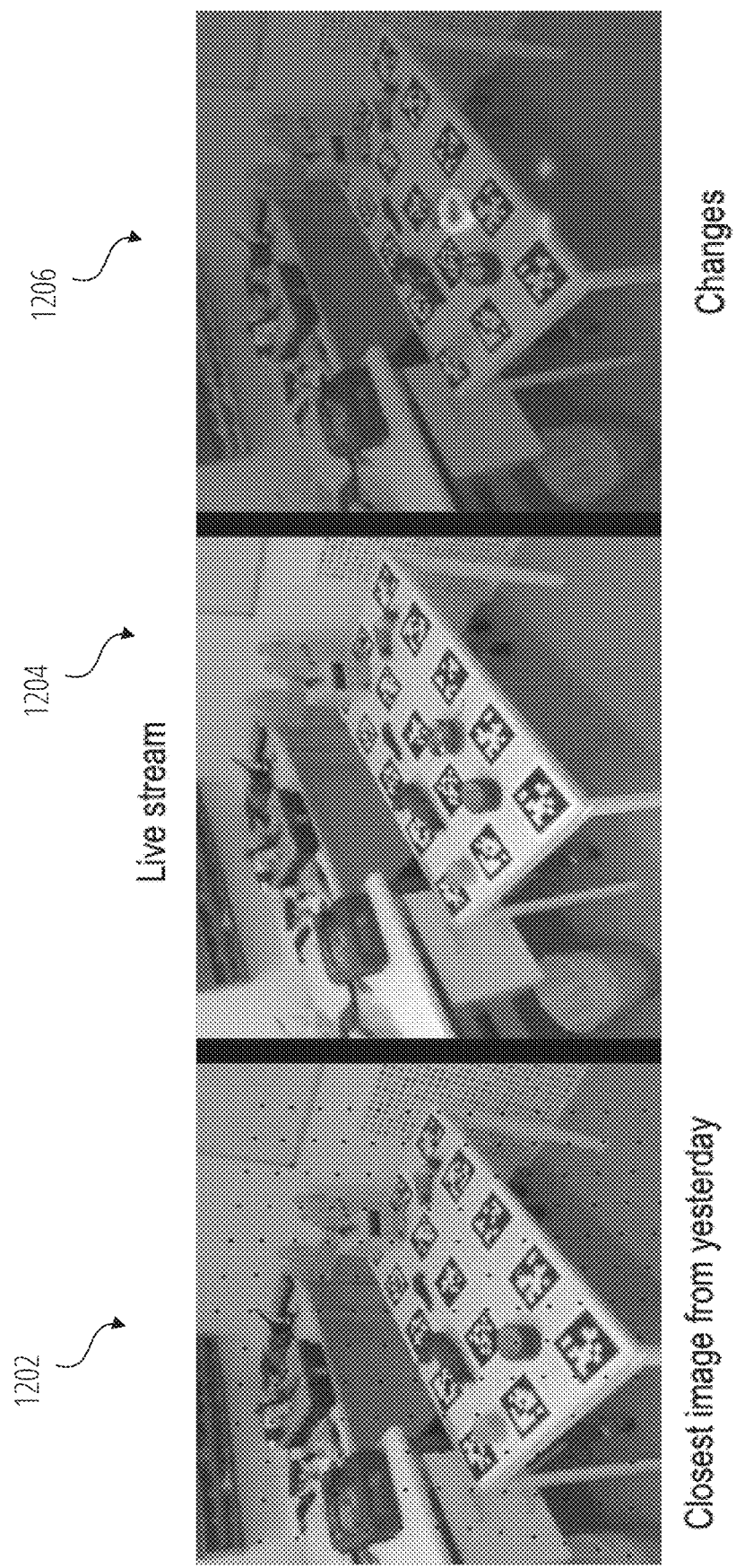
FIG. 12 illustrates an example of visualizing changes in a scene in accordance with one example embodiment.

FIG. 12 illustrates an example of visualizing changes in a scene in accordance with one example embodiment. Image 1202 represents a closest image from a previous session. Image 1204 represents a live stream image from a current session. Image 1206 represents an image with a heatmap overlay that indicates changes in the scene from the image 1202 of the previous session.

Figure 13:
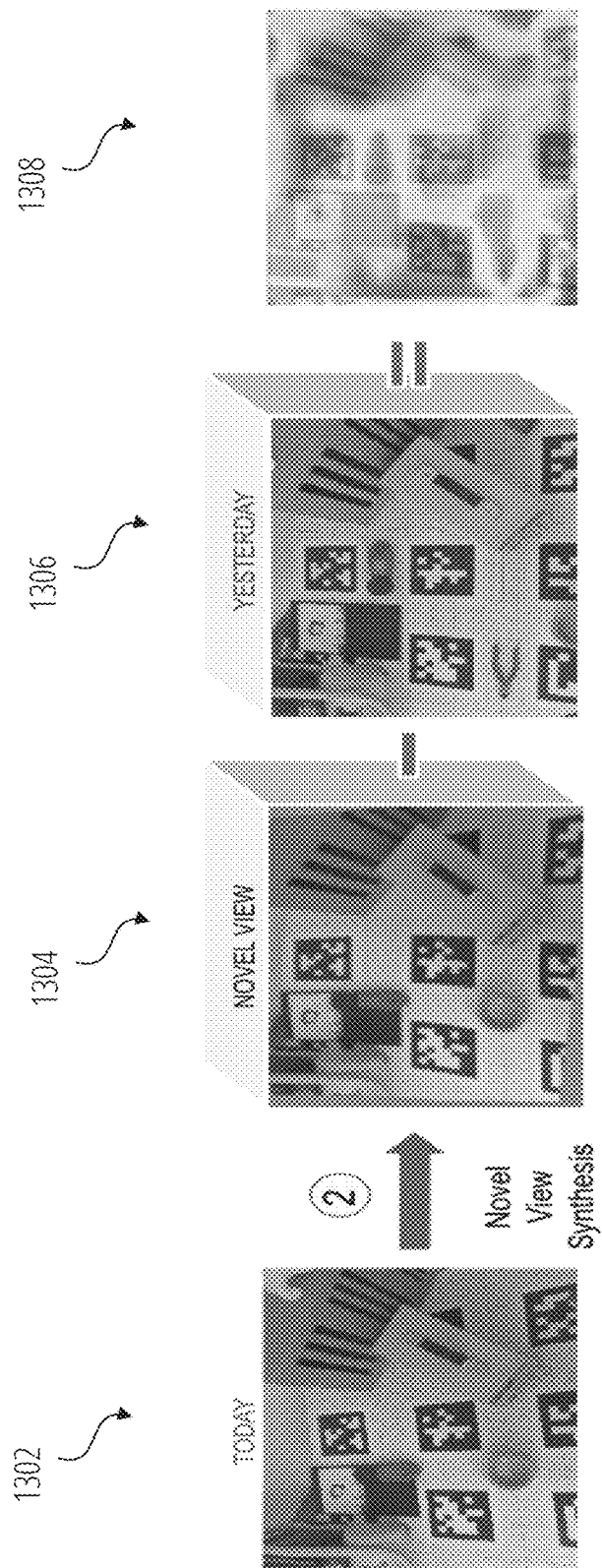
FIG. 13 illustrates an example of visualizing changes in a scene in accordance with one example embodiment.

FIG. 13 illustrates an example of visualizing changes in a scene in accordance with one example embodiment. Image 1302 represents a livestream image from a current session. Image 1304 represents a synthetic image (from a novel view). Image 1306 represents an image from a previous session. Image 1308 represents an image with a heatmap based on subtracted values of deep neural network features between the image 1304 and the image 1306.

Figure 14:
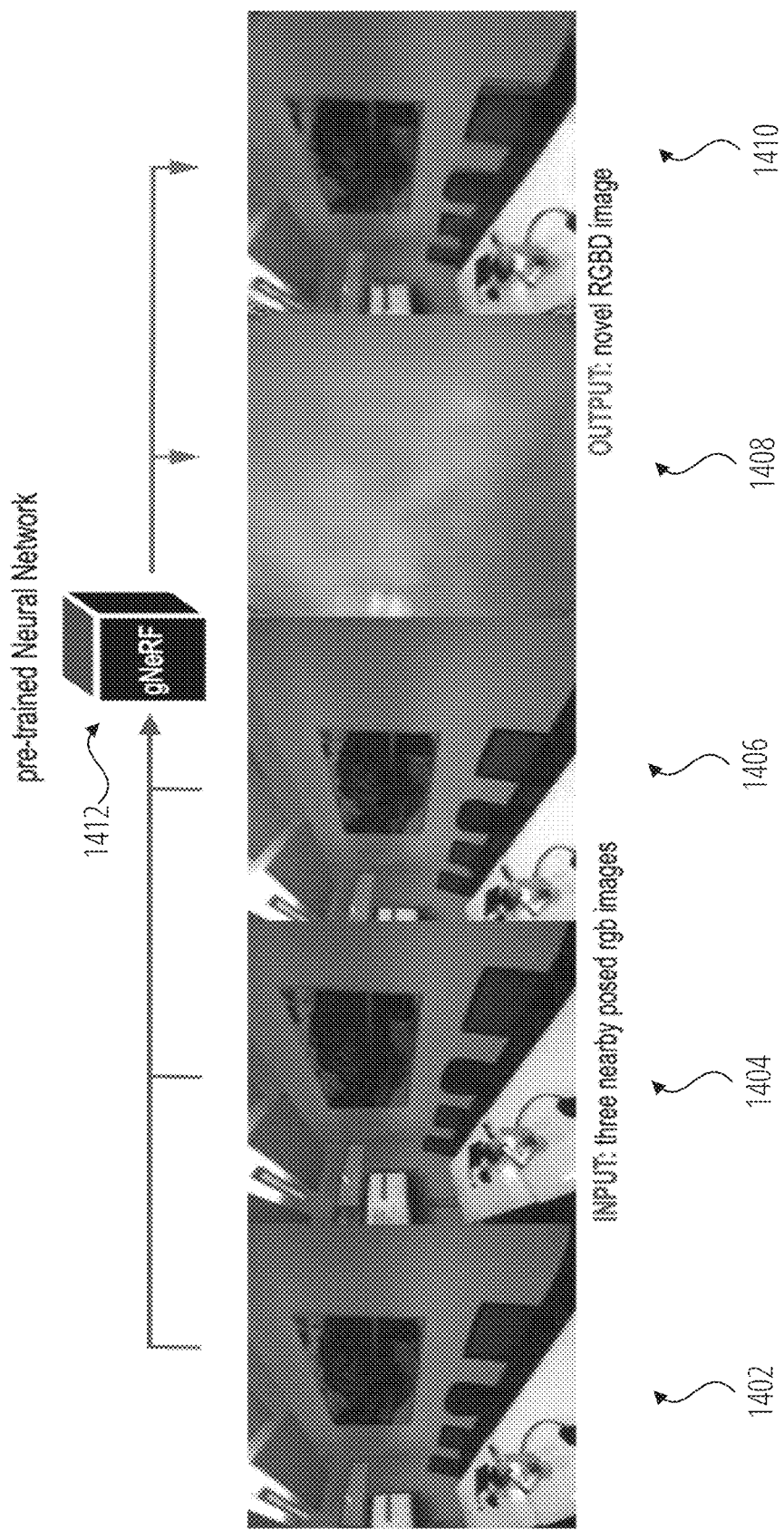
FIG. 14 illustrates an example of generating a synthetic image in accordance with one example embodiment.

FIG. 14 illustrates an example of generating a synthetic image in accordance with one example embodiment. Image 1402, image 1404, and image 1406 represents three RGB images with nearby poses. The images are fed into the neural network 1412 to generate a novel RGB image (e.g., image 1410). Image 1408 represents a depth corresponding to the image 1410.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Described implementations of the subject matter can include one or more features, alone or in combination as illustrated below by way of example.

Example 1 is a method comprising: accessing a first set of images and corresponding pose data in a first coordinate system associated with a first user session of an augmented reality (AR) device; accessing a second set of images and corresponding pose data in a second coordinate system associated with a second user session of the AR device; aligning the first coordinate system with the second coordinate system based on mapping the pose data of the first set of images to the pose data of the second set of images; identifying the first set of images corresponding to a second image from the second set of images based on the pose data of the first set of images being determined spatially closest to the pose data of the second image after aligning the first coordinate system and the second coordinate system; generating, using a trained neural network, a synthesized image from the first set of images; determining differences between features of the second image from features of the synthesized image; and identifying an area of changes based on the differences.

Example 2 includes the method of example 1, wherein the first set of images are generated by an optical sensor of the AR device during the first user session, wherein the second of images are generated by the optical sensor of the AR device during the second user session.

Example 3 includes the method of example 2, wherein the first user session is after the second user session, the first user session associated with a live stream from the AR device, the second user session associated with archived images from the AR device.

Example 4 includes the method of example 2, wherein the second user session is after the first user session, the first user session associated with a live stream from the AR device, the second user session associated with archived images from the AR device.

Example 5 includes the method of example 1, wherein the first user session is initiated in response to a user of the AR device wearing the AR device and terminated in response to the user of the AR device removing the AR device from a portion of a body of the user.

Example 6 includes the method of example 1, further comprising: storing the first set of images and corresponding pose data at a server; storing the second set of images and corresponding pose data at the server; and using the trained neural network at the server to generate the synthesized image.

Example 7 includes the method of example 1, further comprising: generating a heatmap based on the area of changes in the second image; and overlaying a display of the heatmap on the second image.

Example 8 includes the method of example 1, further comprising: generating a heatmap based on the area of changes in the synthesized image; and overlaying a display of the heatmap on the synthesized image.

Example 9 includes the method of example 1, further comprising: generating a heatmap based on the area of changes; and displaying the heatmap in a transparent display of the AR device, wherein the heatmap indicates gradient changes based values of the differences.

Example 10 includes the method of example 1, wherein the neural network comprises a NeRF-based neural network that is not trained with first or second set of images, wherein the features comprise neural network feature vectors, wherein the first set of images and the second set of images comprise two-dimensional images, wherein the AR device comprises a six-degrees of freedom (6DOF) tracker that generates pose data, wherein the 6DOF tracker comprises a visual-inertial odometry (VIO) system, wherein the pose data indicate a position and an orientation of the AR device.

Example 11 is a computing apparatus comprising: a processor; and a memory storing instructions that, when executed by the processor, configure the apparatus to: access a first set of images and corresponding pose data in a first coordinate system associated with a first user session of an augmented reality (AR) device; access a second set of images and corresponding pose data in a second coordinate system associated with a second user session of the AR device; align the first coordinate system with the second coordinate system based on mapping the pose data of the first set of images to the pose data of the second set of images; identify the first set of images corresponding to a second image from the second set of images based on the pose data of the first set of images being determined spatially closest to the pose data of the second image after aligning the first coordinate system and the second coordinate system; generate, using a trained neural network, a synthesized image from the first set of images; determining differences between features of the second image from features of the synthesized image; and identify an area of changes based on the differences.

Example 12 includes the apparatus of example 11, wherein the first set of images are generated by an optical sensor of the AR device during the first user session, wherein the second of images are generated by the optical sensor of the AR device during the second user session.

Example 13 includes the apparatus of example 12, wherein the first user session is after the second user session, the first user session associated with a live stream from the AR device, the second user session associated with archived images from the AR device.

Example 14 includes the apparatus of example 12, wherein the second user session is after the first user session, the first user session associated with a live stream from the AR device, the second user session associated with archived images from the AR device.

Example 15 includes the apparatus of example 11, wherein the first user session is initiated in response to a user of the AR device wearing the AR device and terminated in response to the user of the AR device removing the AR device from a portion of a body of the user.

Example 16 includes the apparatus of example 11, wherein the instructions further configure the apparatus to: store the first set of images and corresponding pose data at a server; store the second set of images and corresponding pose data at the server; and using the trained neural network at the server to generate the synthesized image.

Example 17 includes the apparatus of example 11, wherein the instructions further configure the apparatus to: generate a heatmap based on the area of changes in the second image; and overlay a display of the heatmap on the second image.

Example 18 includes the apparatus of example 11, wherein the instructions further configure the apparatus to: generate a heatmap based on the area of changes in the synthesized image; and overlay a display of the heatmap on the synthesized image.

Example 19 includes the apparatus of example 11, wherein the instructions further configure the apparatus to: generate a heatmap based on the area of changes; and display the heatmap in a transparent display of the AR device, wherein the heatmap indicates gradient changes based values of the differences.

Example 20 is a non-transitory computer-readable storage medium, the computer-readable storage medium including instructions that when executed by a computer, cause the computer to: access a first set of images and corresponding pose data in a first coordinate system associated with a first user session of an augmented reality (AR) device; access a second set of images and corresponding pose data in a second coordinate system associated with a second user session of the AR device; align the first coordinate system with the second coordinate system based on mapping the pose data of the first set of images to the pose data of the second set of images; identify the first set of images corresponding to a second image from the second set of images based on the pose data of the first set of images being determined spatially closest to the pose data of the second image after aligning the first coordinate system and the second coordinate system; generate, using a trained neural network, a synthesized image from the first set of images; determining differences between features of the second image from features of the synthesized image; and identify an area of changes based on the differences.

What is claimed is:

1. A method comprising:
accessing a first set of images and corresponding pose data in a first coordinate system associated with a first user session of an augmented reality (AR) device, wherein the AR device comprises a six-degrees of freedom (6DOF) tracker that generates pose data, wherein the 6DOF tracker comprises a visual-inertial odometry (VIO) system, wherein the pose data indicate a position and an orientation of the AR device;
accessing a second set of images and corresponding pose data in a second coordinate system associated with a second user session of the AR device;
aligning the first coordinate system with the second coordinate system based on mapping the pose data of the first set of images to the pose data of the second set of images;
identifying the first set of images corresponding to a second image from the second set of images based on the pose data of the first set of images being determined spatially closest to the pose data of the second image after aligning the first coordinate system and the second coordinate system;

generating, using a trained neural network, a synthesized image from the first set of images, wherein the trained neural network comprises a NeRF-based neural network that is not trained with the first or second set of images;

determining differences between features of the second image from features of the synthesized image, wherein the features comprise neural network feature vectors, wherein the first set of images and the second set of images comprise two-dimensional images; and identifying an area of changes based on the differences.

2. The method of claim 1, wherein the first set of images are generated by an optical sensor of the AR device during the first user session, wherein the second of images are generated by the optical sensor of the AR device during the second user session.

3. The method of claim 2, wherein the first user session is after the second user session, the first user session associated with a live stream from the AR device, the second user session associated with archived images from the AR device.

4. The method of claim 2, wherein the second user session is after the first user session, the first user session associated with a live stream from the AR device, the second user session associated with archived images from the AR device.

5. The method of claim 1, wherein the first user session is initiated in response to a user of the AR device wearing the AR device and terminated in response to the user of the AR device removing the AR device from a portion of a body of the user.

6. The method of claim 1, further comprising:
storing the first set of images and corresponding pose data at a server;
storing the second set of images and corresponding pose data at the server; and
using the trained neural network at the server to generate the synthesized image.

7. The method of claim 1, further comprising:
generating a heatmap based on the area of changes in the second image; and
overlaying a display of the heatmap on the second image.

8. The method of claim 1, further comprising:
generating a heatmap based on the area of changes in the synthesized image; and
overlaying a display of the heatmap on the synthesized image.

9. The method of claim 1, further comprising:
generating a heatmap based on the area of changes; and
displaying the heatmap in a transparent display of the AR device, wherein the heatmap indicates gradient changes based values of the differences.

10. A computing apparatus comprising:
a processor; and
a memory storing instructions that, when executed by the processor, configure the apparatus to:
access a first set of images and corresponding pose data in a first coordinate system associated with a first user session of an augmented reality (AR) device, wherein the AR device comprises a six-degrees of freedom (6DOF) tracker that generates pose data, wherein the 6DOF tracker comprises a visual-inertial odometry (VIO) system, wherein the pose data indicate a position and an orientation of the AR device;
access a second set of images and corresponding pose data in a second coordinate system associated with a second user session of the AR device;
align the first coordinate system with the second coordinate system based on mapping the pose data of the first set of images to the pose data of the second set of images;
identify the first set of images corresponding to a second image from the second set of images based on the pose data of the first set of images being determined spatially closest to the pose data of the second image after aligning the first coordinate system and the second coordinate system;
generate, using a trained neural network, a synthesized image from the first set of images, wherein the trained neural network comprises a NeRF-based neural network that is not trained with the first or second set of images;
determining differences between features of the second image from features of the synthesized image, wherein the features comprise neural network feature vectors, wherein the first set of images and the second set of images comprise two-dimensional images; and
identify an area of changes based on the differences.

11. The computing apparatus of claim 10, wherein the first set of images are generated by an optical sensor of the AR device during the first user session, wherein the second of images are generated by the optical sensor of the AR device during the second user session.

12. The computing apparatus of claim 11, wherein the first user session is after the second user session, the first user session associated with a live stream from the AR device, the second user session associated with archived images from the AR device.

13. The computing apparatus of claim 11, wherein the second user session is after the first user session, the first user session associated with a live stream from the AR device, the second user session associated with archived images from the AR device.

14. The computing apparatus of claim 10, wherein the first user session is initiated in response to a user of the AR device wearing the AR device and terminated in response to the user of the AR device removing the AR device from a portion of a body of the user.

15. The computing apparatus of claim 10, wherein the instructions further configure the apparatus to:
store the first set of images and corresponding pose data at a server;
store the second set of images and corresponding pose data at the server; and
using the trained neural network at the server to generate the synthesized image.

16. The computing apparatus of claim 10, wherein the instructions further configure the apparatus to:
generate a heatmap based on the area of changes in the second image; and
overlay a display of the heatmap on the second image.

17. The computing apparatus of claim 10, wherein the instructions further configure the apparatus to:
generate a heatmap based on the area of changes in the synthesized image; and
overlay a display of the heatmap on the synthesized image.

18. The computing apparatus of claim 10, wherein the instructions further configure the apparatus to:
generate a heatmap based on the area of changes; and
display the heatmap in a transparent display of the AR device, wherein the heatmap indicates gradient changes based values of the differences.

19. A non-transitory computer-readable storage medium, the computer-readable storage medium including instructions that when executed by a computer, cause the computer to:
- access a first set of images and corresponding pose data in a first coordinate system associated with a first user session of an augmented reality (AR) device, wherein the AR device comprises a six-degrees of freedom (6DOF) tracker that generates pose data, wherein the 6DOF tracker comprises a visual-inertial odometry (VIO) system, wherein the pose data indicate a position and an orientation of the AR device;
- access a second set of images and corresponding pose data in a second coordinate system associated with a second user session of the AR device;
- align the first coordinate system with the second coordinate system based on mapping the pose data of the first set of images to the pose data of the second set of images;
- identify the first set of images corresponding to a second image from the second set of images based on the pose data of the first set of images being determined spatially closest to the pose data of the second image after aligning the first coordinate system and the second coordinate system;
- generate, using a trained neural network, a synthesized image from the first set of images, wherein the trained neural network comprises a NeRF-based neural network that is not trained with the first or second set of images;
- determine differences between features of the second image from features of the synthesized image, wherein the features comprise neural network feature vectors, wherein the first set of images and the second set of images comprise two-dimensional images; and
- identify an area of changes based on the differences.

* * * * *